(12) United States Patent
Sugahara

(10) Patent No.: US 6,286,457 B1
(45) Date of Patent: Sep. 11, 2001

(54) SELF-CLEANING LITTER BOX

(76) Inventor: Andy Sugahara, 2689 Quails Run, Miss Ontario (CA), L5M 5K3

( * ) Notice: Subject to any disclaimer, the term of this patent is extended or adjusted under 35 U.S.C. 154(b) by 0 days.

(21) Appl. No.: 09/411,859

(22) Filed: Oct. 4, 1999

(51) Int. Cl.[7] ................................................. A01K 29/00
(52) U.S. Cl. ........................... 119/165; 119/161; 119/163
(58) Field of Search ................................... 119/161, 163, 119/165, 166, 168

(56) References Cited

U.S. PATENT DOCUMENTS

| | | | |
|---|---|---|---|
| 4,120,264 | * 10/1978 | Carter . | |
| 4,465,018 | * 8/1984 | Mopper | 119/1 |
| 4,493,288 | * 1/1985 | van der Kolk | 119/1 |
| 4,522,150 | * 6/1985 | Gershman . | |
| 4,846,104 | * 7/1989 | Pierson, Jr. . | |
| 5,048,464 | * 9/1991 | Shirley | 119/166 |
| 5,107,797 | * 4/1992 | LaRoche . | |
| 5,181,480 | * 1/1993 | Dabolt | 119/165 |
| 5,477,812 | * 12/1995 | Waters . | |
| 5,509,379 | * 4/1996 | Hoeschen . | |
| 5,551,375 | * 9/1996 | Flores | 119/166 |
| 5,662,066 | * 9/1997 | Reitz | 119/163 |
| 5,752,465 | * 5/1998 | Page . | |
| 6,126,015 | * 10/2000 | Haymaker | 209/235 |

* cited by examiner

Primary Examiner—Charles T. Jordan
Assistant Examiner—Kimberly S Smith
(74) Attorney, Agent, or Firm—Marks & Clerk

(57) ABSTRACT

A self-cleaning cat litter box has the ability to automatically filter and separate clumped soiled litter and fecal matter from clean litter. The apparatus includes a rotatable drum, a spiral filter within the drum, and a stationary back plate. The drawn has front and back walls, and the front wall has a front opening which permits access and egress by a domestic pet. The back wall has a first opening for both the removal of soiled litter and the addition of clean litter. The spiral filter is slotted, and is mounted on the inner surface of the drum. The stationary back plate is parallel to the plane of the back wall and has a second opening which permits the passage of soiled litter away from the drum, and a third opening to permit the passage of clean litter into the drum. The drum is rotated by a suitable drive, which can be electively actuated by a switch. The filter is configured to act as a scoop, and when the drum is at its rest position the filter is at least 10° from the bottommost point on the drum. When the second opening is aligned with the first opening, passage of soiled litter from the filter into disposable collection means occurs. When the third opening is aligned with the first opening, passage clean litter into the drum from a reservoir mounted on the back of the back plate will occur. A domestic pet includes a cat, rabbit, ferret, or skunk.

16 Claims, 3 Drawing Sheets

SELF-CLEANING LITTER BOX

FIELD OF THE INVENTION

This invention relates to an indoor portable self-cleaning litter-box for domestic pets. In particular, this invention relates to a device having means for automatically filtering and separating clumped soiled litter and fecal matter from clean litter.

BACKGROUND OF THE INVENTION

Litter boxes for domestic pets, more especially for cats, are well known. The most common and oldest prior art is the traditional "sandbox". A box, of any material, is filled with sand and placed in the household. To dispose of soiled litter and fecal matter the sandbox the sandbox is emptied manually. Perforated or slotted scoops have since been developed as a means to remove soiled litter and fecal matter. As well, the introduction of "clumping" litter that, when soiled, clumps together has increased the effectiveness of the perforated or slotted scoop for removing soiled litter. However, given that while the majority of the soiled litter and fecal matter may be removed by means previously described, the entire contents of the sandbox or litter box must be emptied and disposed of from time to time. Typically, both the cleaning and changing of litter requires significant human contact with the litter. Contact with domestic pet waste, cat urine in particular, is potentially very dangerous for pregnant women and has been known to cause miscarriages. In addition, the odour associated with domestic pet waste can be particularly offensive and in some cases may cause nausea. More recently, chambers have been introduced in an attempt to overcome the aforementioned problems. Numerous configurations using a chamber, a filter, and disposable means, allow for a more contained litter box which may be rotatable. The filter essentially replaces the perforated or slotted scoop and is mounted on the inner wall of the chamber and acts to separate the waste material from the clean litter. Limitations of the prior art encompass filter difficulty in terms of retaining waste material on the filter and the absence of a simple means for the addition of clean litter.

A self-cleaning litter box in keeping with the present invention avoids the previously described limitations of the prior art. A self-cleaning litter box such as this comprises a rotatable drum, a spiral filter, a stationary back plate, drive means, and switch means. The cylindrical drum has both front and back walls, an axis of rotation, and support means. The spiral filter is mounted on the inner surface of the drum and at least 10° from the bottommost point of the drum when at its rest position. The filter effectively scoops clumped soiled litter and fecal matter from the bottommost region of the rotating drum and collects the waste material on the filter. There is a first opening in the back wall of the drum and second and third openings in the back plate. When the first and second openings are aligned, it allows passage of clumped soiled litter and fecal matter collected by the filter into disposable means through the aligned openings. When the first and third openings are aligned, clean litter from a reservoir may be dispensed into the drum through the aligned openings.

DESCRIPTION OF THE PRIOR ART

U.S. Pat. No. 4,120,264 issued to CARTER teaches a rotatable enclosure or chamber. The rotatable enclosure contains two filter segments wherein soiled agglomerated litter and solid animal excrement are separated from particulate litter. When the drum is rotated, the leading filter segment contacts the litter and filters the material through the filtering grate. As the drum continues to rotate the majority of the litter passes through the filter. The waste material is retained on the first filter segment and is forced by gravity and the incline of the filter toward the second filter segment and the back of the drum. The soiled litter is expelled from the drum via a chute into a disposable bag. The rotatable enclosure is manual in operation, whereby for rotation to occur the litter box owner must rotate it.

U.S. Pat. No. 4,522,150 issued to GERSHMAN teaches an enclosure that is rotated 360° wherein the entire mass of litter passes through a screen and the soiled litter is trapped in a drawer-like container which may be removed in order to dispose of the soiled litter. The rotation is again manual and requires the litter box owner to perform the rotation.

PIERSON, U.S. Pat. No. 4,846,104 provides a rotatable enclosure for use as a litter box for domestic animals. The enclosure contains litter, and rotation of the enclosure cleans the litter by passing the litter through a screen, and the collected waste material is deposited in a receptacle. The particular relevance of this patent is that when cleaning is desired the rotation process itself is not manual and may be initiated by a push button control and timer.

LAROCHE, U.S. Pat. No. 5,107,797 teaches a rotatable enclosure wherein a motor rotates the enclosure and a rake located on the interior surface of the enclosure passes through the litter and effectively separates soiled litter from clean litter. Collected waste material is deposited into a receptacle.

U.S. Pat. No. 5,477,812 issued to WATERS teaches an improved automated self-cleaning litter box for cats, wherein the improvement includes a sensor for sensing the presence of a cat in the litter chamber. Once the cat leaves the litter chamber there is a pre-set time delay that is set into the micro-control. This time interval may be varied and is intended to allow for a period of time wherein the cat may return to the litter box. Once the delay period is over, the self-cleaning operation begins automatically. The litter box is rectangular in shape and uses an automated rake device as it cleaning mechanism.

U.S. Pat. No. 5,509,379 issued to HOESCHEN provides a rotating cylinder with an internal surface for receiving animal litter and waste materials. This cylinder employs a series of rollers along the base in order for facilitate rotation. As the cylinder rotates within the base, the litter and animal waste falls onto a separation screen. As the rotation continues, the clean litter passes through the screen, and the waste supported on the screen is removed by a collection assembly.

PAGE, U.S. Pat. No. 5,752,465 teaches a rotatable drum which uses a sieving panel to isolate solid and clumped litter from particulate litter. A funnel region present on the interior wall directs waste material to a chute adapted to hold a disposable plastic bag.

SUMMARY OF THE INVENTION

In accordance with one aspect of the present invention, there is provided a self-cleaning litter box.

The apparatus comprises a rotatable drum being cylindrical and adapted to contain litter. The drum itself having front and back walls, an axis of rotation and support means. There is a spiral filter mounted on the inner surface of the drum, a stationary back plate, drive means, and switch means.

The rotatable drum has a front opening in the front wall which serves as an access and egress suitable for a domestic pet to pass through. There is provided a first opening in the back wall for both the removal of soiled litter and the addition of clean litter.

The axis of rotation of the drum is located along the centre line and passes longitudinally through the drum. The drum is symmetric about its axis of rotation and is rotatably mounted on the support means which comprise at least two bearings. These bearings facilitate the rotation of the drum.

The stationary back plate is both parallel to the plane of the back wall and flush with the back wall of the drum. There is a second opening in the back plate that permits the passage of clumped soiled litter and fecal matter away from the drum. The back plate also has a third opening, at least 180° from the second opening, that allows the passage of clean litter in to the drum. At least a portion of the second opening in the back plate is substantially in the same plane as the axis of rotation of the drum.

The filter spans the length of the drum and at least 180° of the inner surface of the drum. The spiral angle of the filter is between 25°–50°. The spiral filter has first and second ends where the first end of the filter is proximate to the front wall of the drum and the second end proximate is to the back wall of the drum.

When the drum is at its rest position, the first end of the filter is located at least 10° from the bottommost point of the drum. In addition, when the drum is at its rest position, the second and third openings of the back plate are covered by the back wall of the drum.

The filter is configured such that it acts as a scoop. As the drum is rotated through one full revolution, the first end of the filter will contact the litter and the length of the filter will pass through the litter, effectively scooping clumped soiled litter and faecal matter from the litter. The waste material is collected on the filter.

When the second opening in the back plate is in alignment with the first opening in the back wall, it allows the passage of clumped soiled litter and faecal matter retained by the filter from the drum into disposable collection means through the aligned first and second openings.

The third opening in the back plate is positioned at the base of a reservoir where excess clean litter may be stored. When the third opening in the back plate is in alignment with the first opening in the back wall, clean litter is dispensed into the drum from the reservoir through the aligned first and third openings. The reservoir may have a sloped bottom wall so as to encourage the flow by gravity of clean litter from the reservoir into the drum.

The drive means rotatably drive the drum while the switch means electively drive the drive means.

The drive means comprises a control means which incorporates a motion sensor. This motion sensor detects the presence of a domestic pet within the drum. If the drum is being rotated at an instant in time when the presence of the domestic pet is sensed by the motion sensor, the rotation of the drum is stopped. The motion sensor may further include a timer such that, after a pre-determined period of time has elapsed since a domestic pet has left the interior of the drum as sensed by the motion sensor, a single rotation of the drum is effected. The switch means overrides the control means such that rotation of the drum may be effected at any instant in time by activation of the switch means.

The spiral filter has an upper surface defined by the innermost concave surface. This upper surface retains clumped soiled litter and fecal matter. As the drum is rotated, the filter effectively begins to scoop the litter, the particulate litter passes through the slotted filter while the clumped soiled litter and fecal matter is retained on the upper surface of the filter. The scooping action of the filter progressively moves from the first end of the filter to the second end of the filter as the drum rotates.

The spiral filter may be constructed as a series of curved rods arranged one beside the next, a single curved piece, a series of filter segments, and combinations thereof. Each of the aforementioned may be constructed from plastic, metal, and combinations thereof.

In an alternative embodiment the rotatable drum may have a front panel attached to the front wall at the bottommost point of the front opening. The front panel serves to decrease the size of the access and egress opening and lessen the spillage of litter which may be caused by a domestic pet.

The first opening in the back wall of the drum is sloped so as to facilitate the flow by gravity of clumped soiled litter and faecal matter from the drum, and the flow of clean litter into the drum Each of the second and third openings in the back plate is sloped so as to facilitate the flow by gravity of clumped soiled litter and faecal matter from the drum into disposable collection means, and clean litter from the reservoir into the drum respectively.

A selected amount of litter is dispensed into the drum by the adjustment of a sliding plate covering the third opening in the back plate. The sliding plate may be marked with indicia, as well, indicium may be marked on the back plate proximate to the sliding plate such that the selection of a metered amount of litter is dispensed into the drum.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
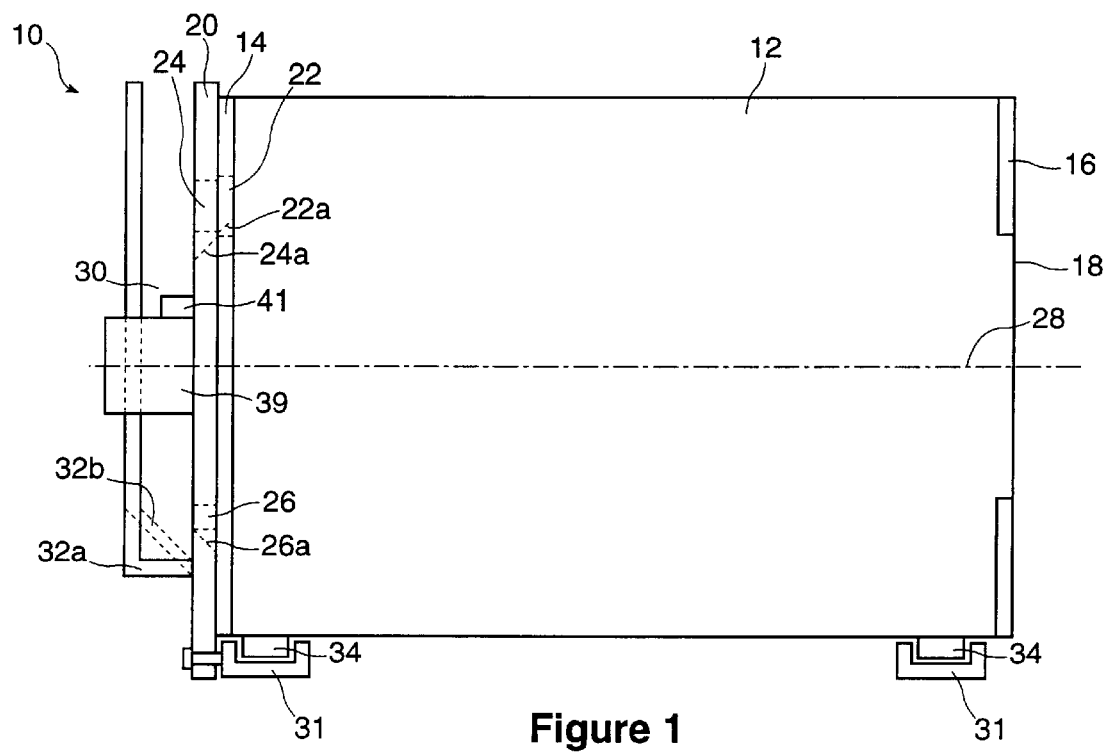
FIG. 1 is a side view of the configuration of a first embodiment of the self-cleaning litter box apparatus of the present invention.
Figure 2:
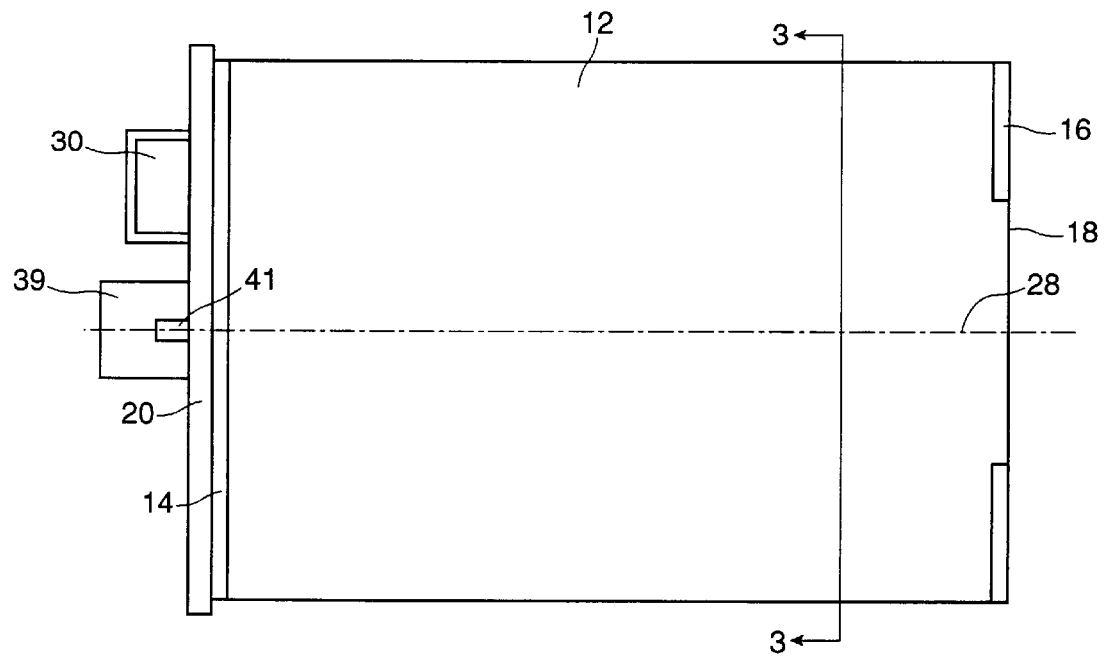
FIG. 2 is a top view of the self-cleaning litter box of FIG. 1.

Referring now to the drawings, there is illustrated a self-cleaning litter box, generally designated by reference numeral 10.

The self-cleaning litter box 10 is shown in general configuration in FIG. 1. The self-cleaning litter box 10 comprises a rotatable drum 12, which is cylindrical and adapted to contain litter. The drum 12 has front 16 and back 14 walls, an axis of rotation 28, and support means 31. There is a front opening 18 in the front wall 16 which serves as an access and egress suitable for a domestic pet to pass through. There is a first opening 22 in the back wall 14 of the drum 12 for both the removal of soiled litter and the addition of clean litter. There is also a spiral filter 36 mounted on the inner surface of the drum 12, a stationary back plate 20, drive means 39, and switch means 40.

The axis of rotation 28 of the drum 12 is located along the centre line and passes longitudinally through the drum 12. The drum 12 is symmetric about its axis of rotation 28, and is rotatably mounted on the support means 34 which comprise at least two bearings 34. These bearings facilitate the rotation of the drum 12.

Of the bearings 34, at least one bearing 34 is located near the front wall 16 and at least another bearing 34 near the back wall 14. The bearing 34 nearest the back wall 14 may be a support bearing as shown in FIG. 1, or may be located on the axis of rotation 28.

The stationary back plate 20 is both parallel to the plane of the back wall 14 and is nearly flush with the back wall 14 of the drum 12. There is a second opening 24 in the back plate 20 that permits the passage of clumped soiled litter and fecal matter away from the drum 12. The back plate 20 also has a third opening 26, at least 180° from the second opening 24, that allows the passage of clean litter into the drum 12. At least a portion of the second opening 24 in the back plate 20 is substantially in the same plane as the axis of rotation 28 of the drum 12.

Figure 3:
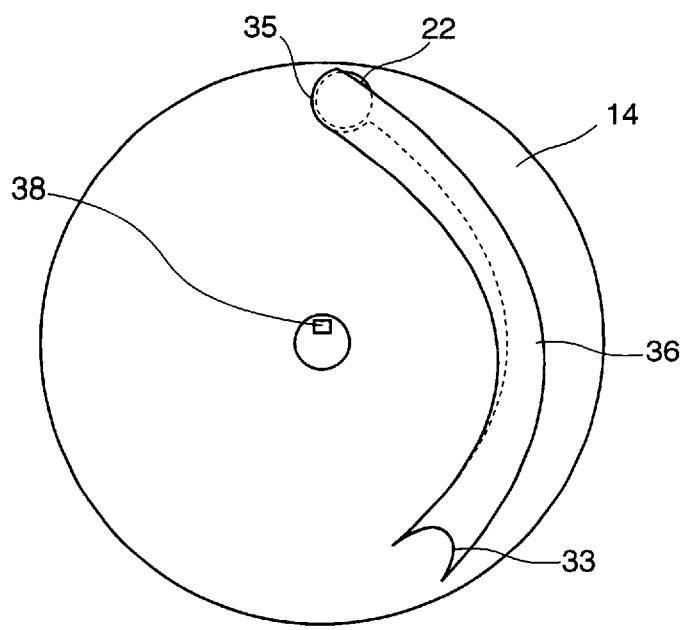
FIG. 3 is a vertical cross-sectional view cut along line 3—3 of FIG. 2.

The filter 36, as shown in FIG. 3, spans the length of the drum 12 and at least 180° of the inner surface of the drum. The spiral angle of the filter 36 is between 25° and 50°. The spiral filter 36 has first and second ends 33, 35, respectively, where the first end 33 of the filter 36 is proximate to the front wall 16 of the drum 12 and the second end 35 is proximate to the back wall 14 of the drum 12.

When the drum 12 is at its rest position, the first end 33 of the filter 36 is located at least 10° from the bottommost point of the drum. In addition, when the drum 12 is at its rest position, the second 24 and third 26 openings of the back plate 20 are covered by the back wall 14 of the drum 12.

The filter 36 is configured such that it acts as a scoop. As the drum 12 is rotated through one full revolution, the first end 33 of the filter 36 will contact the litter and the length of the filter will pass through the litter, effectively scooping clumped soiled litter and fecal matter from the litter.

When the second opening 24 in the back plate 20 is in alignment with the first opening 22 in the back wall 14, it allows the passage of clumped soiled litter and fecal matter retained by the filter 36 from the drum 12 into disposable collection means 43 through the aligned first and second openings 22, 24, respectively. Conveniently, a small chute may be attached to the back plate 20; and then disposable collections means may be such as a plastic grocery back or a kitchen garbage bag attached around the chute by such means as a rubber band.

Such an arrangement contains odours from the soiled clumped litter and fecal matter which are in the disposable collection bag, and precludes escape of gasses from the soiled clumped litter—especially those associated with feline urine—so as to thereby reduce the risks of exposure thereto by pregnant women.

The third opening 26 in the back plate 20 is positioned at the base 32 of a reservoir 30 where clean litter may be stored. When the third opening 26 in the back plate 20 is in alignment with the first opening 22 in the back wall 14, clean litter is dispensed into the drum 12 from the reservoir 30 through the aligned first and third openings 22, 26, respectively. The reservoir 30 may have a sloped bottom wall 32b so as to encourage the flow by gravity of clean litter from the reservoir 30 into the drum 12, or a horizontal bottom wall 32a.

The drive means rotatably drive the drum 12, while the switch means selectively actuates the drive means.

The drive means 39 may include a control means 41 which incorporates a motion sensor 38. This motion sensor 38 detects the presence of a domestic pet within the drum 12. If he drum 12 is being rotated at an instant in time when the presence of a domestic pet is sensed by the motion sensor 38, the rotation of the drum 12 is stopped. The motion sensor 38 may further include a timer such that, after a predetermined period of time has elapsed since a domestic pet has left the interior of the drum 12 as sensed by the motion sensor 38, a single rotation of the drum 12 is effected. The switch means overrides the control means such that the rotation of the drum 12 may be affected at any instant in time by activation of the switch means.

Figure 5:
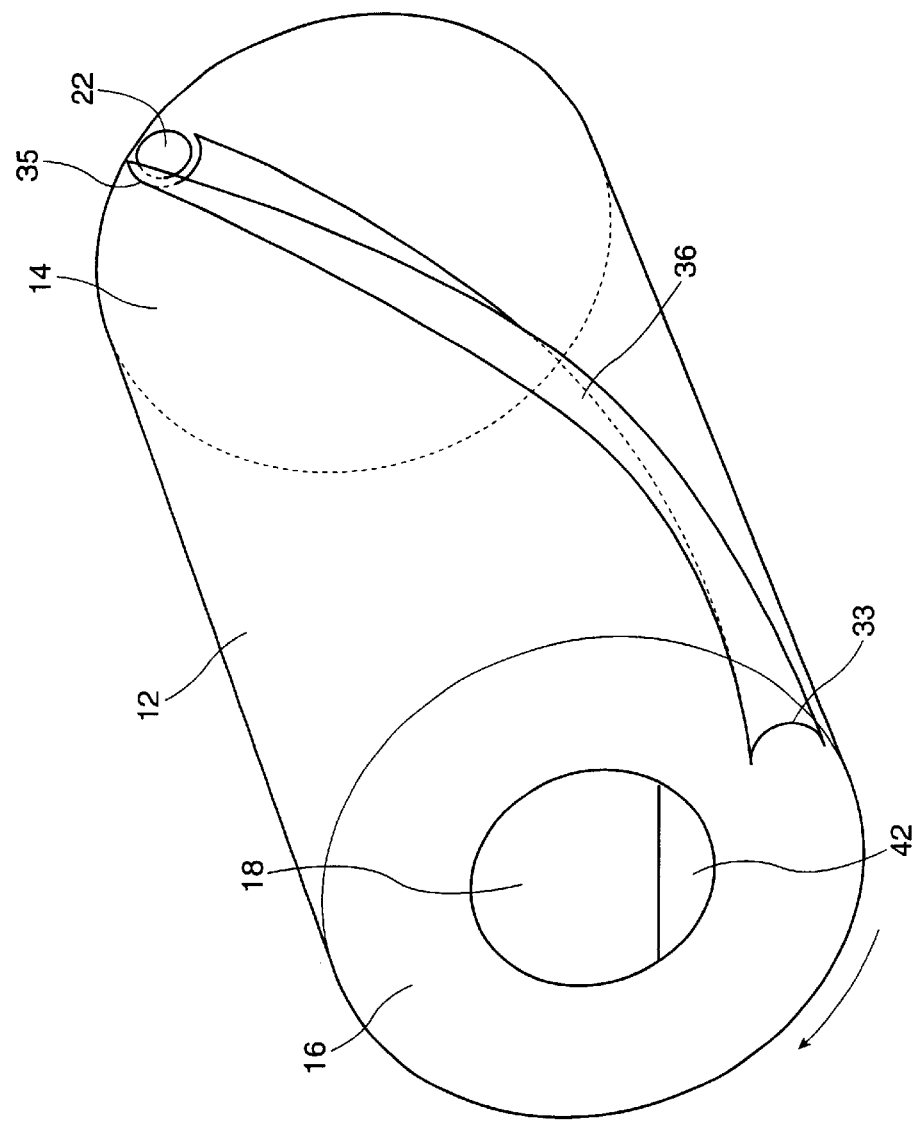
FIG. 5 is a perspective view of the rotatable drum, in keeping with the present invention.

The spiral filter 36, as shown in FIG. 5, has an upper surface defined by the innermost concave surface. This upper surface retains clumped soiled litter and fecal matter. As the drum 12 is rotated, the filter 36 effectively begins to scoop the litter, the particulate litter passes through the spiral filter 36 while the clumped soiled litter and fecal matter is retained on the upper surface of the filter. The scooping action of the filter 36 progressively moves from the first end 33 of the filter 36 to the second end 35 of the filter 36 as the drum 12 rotates.

The spiral filter 36 may be constructed from a series of curved rods arranged one beside the next as shown in FIG. 3, a single curved piece, a series of filter segments, and combinations thereof. Each of the aforementioned may be constructed from plastic, metal, and combinations thereof.

In an alternative embodiment, the rotatable drum 12 may have a front panel 42, as shown in FIG. 5, attached to the front wall 16 at the bottommost point of the front opening 18. The front panel 42 serves to decrease the size of the access and egress opening 18 and lessen the spillage of litter which may be caused by a domestic pet.

The first opening 22 in the back wall 14 of the drum 12 may be sloped downwardly at 22a so as to facilitate the flow by gravity of clumped soiled litter and fecal matter from the drum 12, and the flow of clean litter into the drum 12.

Each of the second 24 and third 26 openings in the back plate 20 maybe sloped downwardly at 24a and 26a, respectively, so as to facilitate the flow by gravity of clumped soiled litter and fecal matter away from the drum 12 into the disposable collection means, and clean litter from the reservoir 30 into the drum 12.

Figure 4:
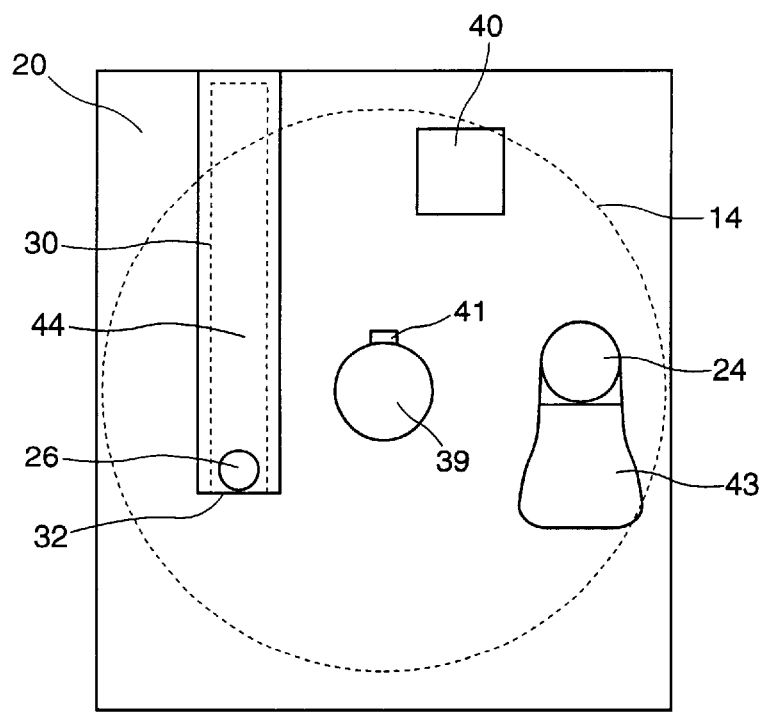
FIG. 4 is a rear view of the self-cleaning litter box of FIG. 1.

A selected amount of litter may be dispensed into the drum 12 by adjustment of a sliding plate 44 covering the third opening 26 in the back plate 20, as shown in FIG. 4. The sliding plate 44 may be marked with indicia and, as well, an indicium may be marked on the back plate 20 proximate to the sliding plate 44, such that the selection of a specific metered amount of litter to be dispensed into the drum may be effected.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element.

What is claimed is:

1. A self-cleaning litter box comprising:

a rotatable drum adapted to contain litter; said drum being cylindrical and having front and back walls, an axis of rotation, and support means, and having a front opening in said front wall which serves as an access and egress suitable for a domestic pet to pass through, and a first opening in said back wall for both the removal of soiled litter and the addition of clean litter; wherein said axis of rotation of said drum is located along the centerline passing longitudinally through said drum;

said drum being rotatably mounted on said support means comprising at least two bearings which facilitate the rotation of said drum;

a spiral filter, having first and second ends, mounted on the inner surface of said drum; said filter being slotted, and adapted such that clean litter passes through said filter while clumped soiled litter and fecal matter is retained by said filter;

a stationary back plate located parallel to the plane of said back wall of said drum, and being flush with said back wall of said drum, said back plate having a second opening therethrough to permit the passage of clumped soiled litter and fecal matter away from said drum;

said back plate also having a third opening to permit the passage of clean litter into said drum, where said second and third openings are located at least 180° apart;

drive means for rotatably driving said drum; and switch means for electively driving said drum by said drive means;

wherein said spiral filter spans the length of said drum and at least 180° of said inner surface of said drum; and wherein said filter has a spiral angle of at least 30°;

wherein said filter is configured such that it functions as a scoop, and so that as said drum is rotated through one fill revolution, said first end of said filter will contact the litter, and the length of said filter will pass through the litter effectively scooping clumped soiled litter and fecal matter therefrom, which is then retained by said filter;

wherein, when said drum is at its rest position, said first end of said filter is located at least 10° from the bottommost point on said drum and said second and third openings of said back plate are covered by said back wall of said drum;

wherein at least a portion of said second opening in said back plate is located on one side of said drum in substantially the same plane as said axis of rotation of said drum;

wherein, when said second opening in said back plate is in alignment with said first opening in said back wall of said drum, it allows passage of clumped soiled litter and fecal matter from said filter into disposable collection means through said aligned first opening and said second opening;

wherein said third opening in said back plate is positioned at the base of a reservoir where excess clean litter may be stored; whereby clean litter from said reservoir may be dispensed into said drum when said third opening in said back plate is in alignment with said first opening in said back wall of said drum;

wherein, when said drum is rotated about said axis of rotation, said filter effectively scoops clumped soiled litter and fecal matter from the bottommost region of the rotating drum, and collects the waste material on said filter, and when said third opening in said back plate and said first opening in said back wall of said drum come into alignment, clean litter is dispensed into said drum from said reservoir through said third opening of said back plate.

2. The self-cleaning litter box of claim 1, wherein said drive means has a control means which incorporates a motion sensor to detect the presence of a domestic pet within said drum and so as to stop the rotation of said drum if the presence of a domestic pet is detected, and if said drum is being rotated at that instant in time.

3. The self-cleaning litter box of claim 2, wherein said motion sensor further includes a timer, whereby, after a pre-determined period of time has elapsed since a domestic pet has left the interior of said drum as sensed by said motion sensor, a single rotation of said drum is effected.

4. The self-cleaning litter box of claim 2, wherein said switch means will override said control means such that rotation of said drum at any instant in time may be effected by actuation of said switch means.

5. The self-cleaning litter box of claim 1, wherein said filter has an upper surface defined by the innermost concave surface of said filter, and said upper surface retains said clumped soiled litter and fecal matter.

6. The self-cleaning litter box of claim 1, wherein said filter is a curved structure and said first end of said filter is located proximate to said front wall of said drum and said second end of said filter is located proximate to said back wall of said drum; wherein, as said drum is rotated, said first end of said filter first contacts the litter located near the bottommost point of said drum and effectively begins to scoop said litter, the particulate litter passes through said slotted filter while clumped soiled litter and fecal matter is retained by said filter; and wherein the scooping action of said filter progressively moves from the first end of said filter to the second end of said filter as the drum rotates.

7. The self-cleaning litter box of claim 1, wherein said filter is chosen from the group consisting of a series of curved rods arranged one beside the next, a single curved piece, a series of filter segments, and combinations thereof.

8. The self-cleaning litter box of claim 7, wherein the material for said filter is chosen from the group of plastic, metal, and combinations thereof.

9. The self-cleaning litter box of claim 1, wherein said drum has a front panel attached to said front wall at the bottommost point of said front opening; wherein said front panel serves to decrease the size of said access and egress opening and lessen the spillage of litter that may be caused by a domestic pet.

10. The self-cleaning litter box of claim 1, wherein said reservoir of clean litter has a sloped bottom wall so as to encourage the flow by gravity of clean litter from said reservoir into said drum when said third opening in said back plate and said first opening in said back wall are in alignment.

11. The self-cleaning litter box of claim 10, wherein said first opening in said back wall of said drum is sloped so as to facilitate the flow by gravity of clumped soiled litter and fecal matter from said drum, and the flow of clean litter into said drum.

12. The self-cleaning litter box of claim 1, wherein said second opening in said back plate is sloped so as to facilitate the flow by gravity of clumped soiled litter and fecal matter from said drum into said disposable collection means.

13. The self-cleaning litter box of claim 1, wherein said third opening in said back plate is sloped so as to facilitate the flow by gravity of clean litter from said reservoir into said drum.

14. The self-cleaning litter box of claim 1, wherein a selected amount of litter is dispensed into said drum by the adjustment of a sliding plate covering said third opening in said back plate.

15. The self-cleaning litter box of claim 14, wherein said sliding plate is marked with indicia, whereby a metered amount of litter is dispensed into said drum.

16. The self-cleaning litter box of claim 14, wherein an indicium is marked on said back plate proximate to said sliding plate to allow for the selection of a metered amount of litter to be dispensed into said drum.

* * * * *